United States Patent [19]
Chi

[11] Patent Number: 5,924,801
[45] Date of Patent: Jul. 20, 1999

[54] BEARING ASSEMBLY FOR A BOTTOM BRACKET OF A BICYCLE

[76] Inventor: Yi-Chen Chi, No. 139-5, An-Mei Rd., Houli Hsiang, Taichung, Taiwan

[21] Appl. No.: 09/034,243

[22] Filed: Mar. 4, 1998

[51] Int. Cl.⁶ .................................................. F16C 19/08
[52] U.S. Cl. ........................... 384/545; 384/510; 384/537
[58] Field of Search ..................................... 384/545, 537, 384/510, 513, 515

[56] References Cited

U.S. PATENT DOCUMENTS 5,163,758  11/1992  Chi ........................................ 384/545
5,509,739  4/1996  Chi .......................................... 384/545

*Primary Examiner*—Lenard A. Footland
*Attorney, Agent, or Firm*—Rosenberg Klein & Bilker

[57] ABSTRACT

A bearing assembly for a bottom bracket which includes a sleeve through which an axle rotatably extends with two sets of bearing assembly disposed between the sleeve and the axle. Each bearing assembly has an annular cap which has a lip member extending radially and inwardly from an inner periphery thereof, and an annular race which is disposed between the annular cap and the lip member so as to rotatably receive balls between the annular cap and the annular race. A bushing is mounted to the axle and inserted between the axle and the annular race.

4 Claims, 4 Drawing Sheets

BEARING ASSEMBLY FOR A BOTTOM BRACKET OF A BICYCLE

BACKGROUND OF THE INVENTION

1. Field of the Invention

The present invention relates to a bearing assembly comprising an annular cap and an annular race which is fixedly connected to an inner periphery of the annular cap with balls rotatably received between the annular race and the annular race, and a bushing inserted between an axle of the bottom bracket and the annular race.

2. Brief Description of the Prior Art

FIGS. 3 and 4 show a conventional bearing assembly used in a bottom bracket of a bicycle or the like. The bottom bracket includes a sleeve 10 and an axle 11 extends through the sleeve 10 with two sets of bearing assembly (only one is shown) disposed between the sleeve 10 and the axle 11 so that the axle 11 is rotatable. The two sets of bearing assembly each have an ring-type retainer 13 within which a plurality of balls 130 are rotatably positioned. The bearing assembly is received between an annular cap 12 and a bushing 14 which has a groove 141 defined in a distal end thereof so as to suitably receive the balls 130 therein.

The ring-type retainer 13 has a complicated configuration so that it has to be manufactured by a special designed machine which is expensive. Furthermore, a heat treatment is needed to the bushing 14, especially to the groove 141. In addition, there are three parts, the annular cap 12, the retainer 13 with the balls 130 and the bushing 14, each of the parts are prepared separately and sent to an assembling factor to assemble the bottom bracket. Assemblers have to take three processes to assemble the bottom bracket.

The present invention intends to provide an improved bearing assembly which includes only two parts and a bushing of the bottom bracket does not need a heat treatment. The present invention resolves the above-mentioned problems.

SUMMARY OF THE INVENTION

In one aspect of the present invention, there is provided a bearing assembly for a bottom bracket which includes a sleeve through which an axle rotatably extends. The bearing assembly includes an annular cap having a first groove defined in an inner periphery thereof, a lip member extending radially and inwardly from the inner periphery of the annular cap. An annular race has a second groove defined in an inner periphery thereof and a rim portion thereof is disposed between the annular cap and the lip member so as to rotatably receive a plurality of balls between the first groove and the second groove. A bushing is mounted to the axle and has an insertion portion which is inserted between the axle and the annular race.

It is an object of the present invention to provide a bearing assembly for a bottom bracket wherein there are only two parts disposed between the sleeve and the axle.

It is another object of the present invention to provide a bearing assembly for a bottom bracket wherein the bushing does not need a heat treatment.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
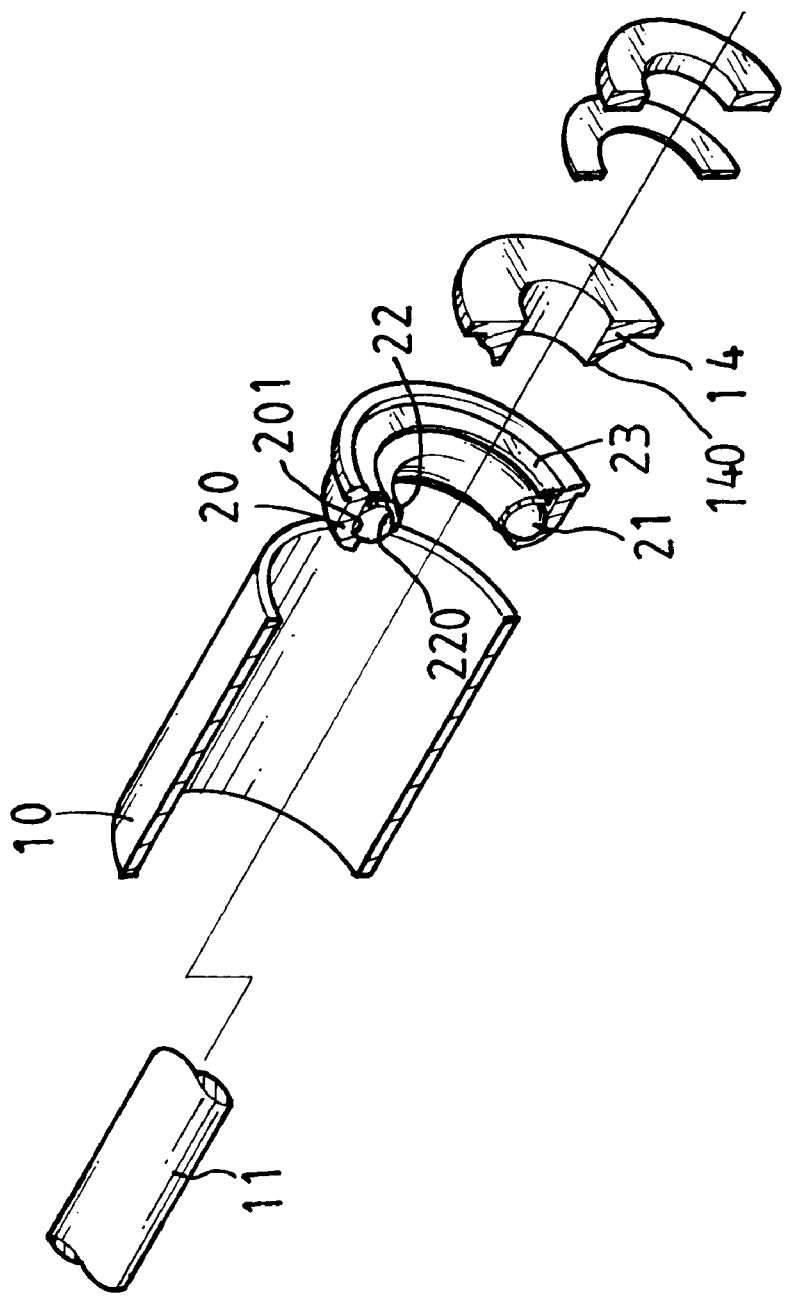
FIG. 1 is an exploded view of a bottom bracket and a bearing assembly in accordance with the present invention.
Figure 2:
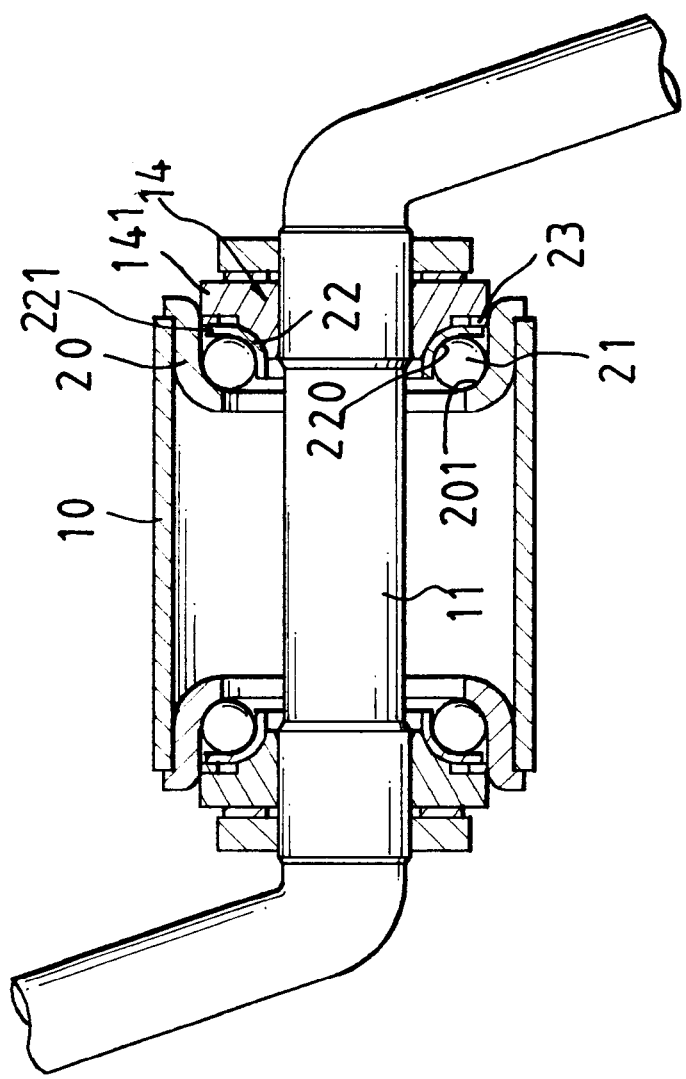
FIG. 2 is a side elevational view, partly in section, of the bottom bracket with two sets of bearing assembly of the present invention.
Figure 3:
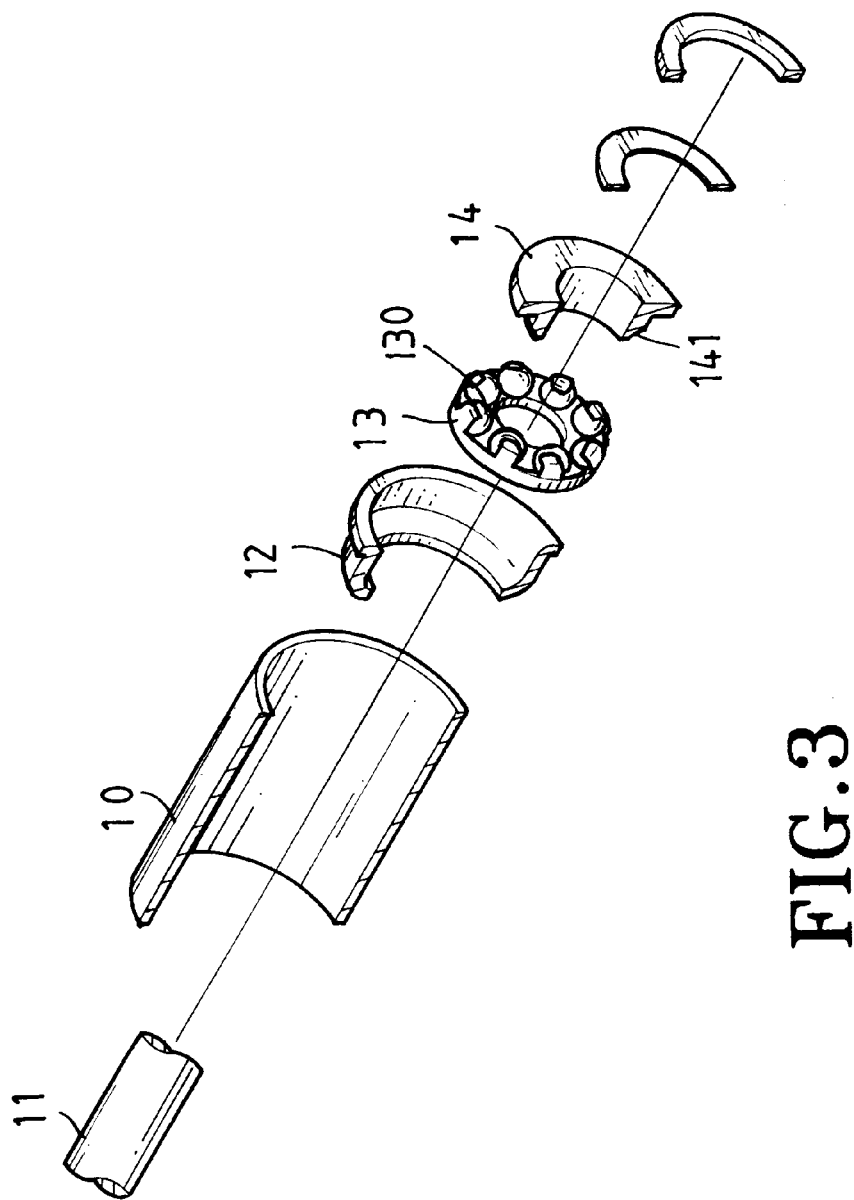
FIG. 3 is an exploded view of a conventional bottom bracket and a conventional bearing assembly.
Figure 4:
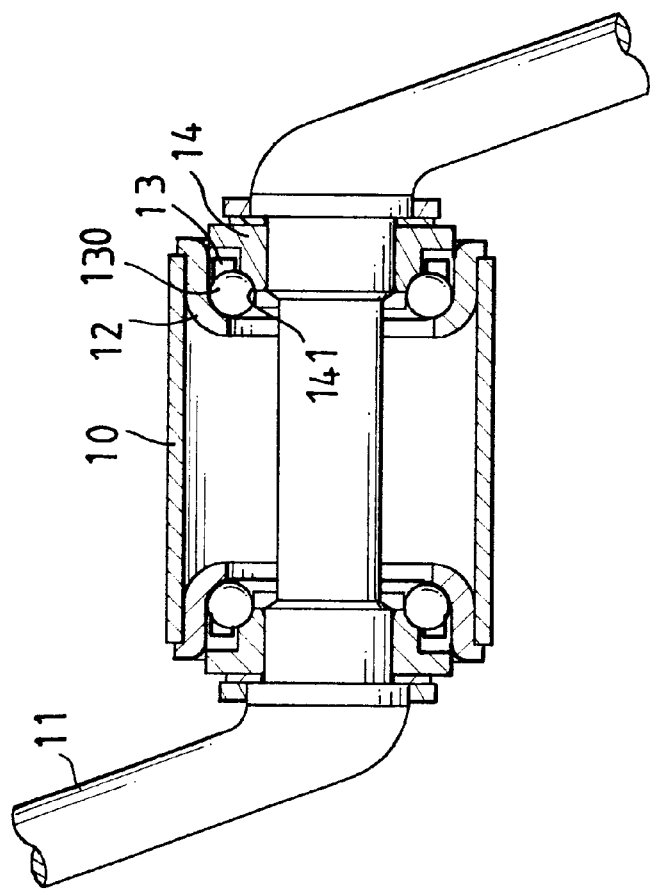
FIG. 4 is a side elevational view, partly in section, of the conventional bottom bracket with two sets of the conventional bearing assembly.

Referring to FIGS. 1 and 2, a bottom bracket includes a sleeve 10 through which an axle 11 extends with two sets of bearing assembly disposed between the sleeve 10 and the axle 11. The bearing assembly in accordance with the present invention generally includes an annular cap 20 having a first groove 201 defined in an inner periphery thereof, a lip member 23 extending radially and inwardly from the inner periphery of the annular cap 20. An annular race 22 has a second groove 220 defined in an inner periphery thereof and a rim portion 221 disposed between the inner periphery of the annular cap 20 and the lip member 23. A plurality of balls 21 are rotatably received between the first groove 201 and the second groove 220, wherein balls 21 exert a force to the rim portion 221 of the annular race 22 to contact the lip member 23 so that the rim portion 221 of the annular race 22 and the lip member 23 are snugly engaged with each other.

A bushing 14 is mounted to the axle 11 and has an insertion portion 140 which is snugly inserted between the axle 11 and the annular race 22. The bushing 14 further has a flange 141 extending outwardly therefrom so as to contact against the lip member 23.

It is appreciated that the annular cap 20, the lip member 23, the annular race 22, and the balls 21 are made to be a one-piece member before they are sent to the assembling factory so that there are only two parts, the one-piece member and the bushing 14, to be assembled by the assemblers. Furthermore, the bushing 14 does not directly contact the balls 21 so that the bushing 14 does not need a heat treatment which reduces manufacturing cost.

While particular embodiments of the present invention have been illustrated and described herein, it is not intended to limit the invention and changes and modifications may be made therein within the scope of the invention as hereinafter claimed.

What is claimed is:

1. A bearing assembly for a bottom bracket including a sleeve with an axle extending therethrough, comprising:

an annular cap having a first groove defined in an inner periphery thereof, a lip member extending radially and inwardly from the inner periphery of said annular cap;

an annular race having a second groove defined in an inner periphery thereof and a rim portion thereof disposed between said inner periphery of said annular cap and said lip member, a plurality of balls rotatably received between said first groove and said second groove, and a bushing being adapted to be mounted to said axle and having an insertion portion which is adapted to be inserted between said axle and said annular race.

2. The bearing assembly as claimed in claim 1 wherein said bushing has a flange extending outwardly therefrom so as to contact against said lip member.

3. The bearing assembly as claimed in claim 1 wherein said rim portion of said annular race and said lip member are snugly engaged with each other.

4. The bearing assembly as claimed in claim 1 wherein said balls exert a force to said rim portion of said annular race to contact said lip member.

* * * * *